(12) United States Patent
Saukaitis

(10) Patent No.: US 8,048,199 B2
(45) Date of Patent: Nov. 1, 2011

(54) METHOD OF MAKING A LEAK STABLE GAS SEPARATION MEMBRANE SYSTEM

(75) Inventor: John Charles Saukaitis, Katy, TX (US)

(73) Assignee: Shell Oil Company, Houston, TX (US)

( * ) Notice: Subject to any disclaimer, the term of this patent is extended or adjusted under 35 U.S.C. 154(b) by 371 days.

(21) Appl. No.: 12/032,971

(22) Filed: Feb. 18, 2008

(65) Prior Publication Data

US 2009/0120293 A1 May 14, 2009

Related U.S. Application Data

(60) Provisional application No. 60/890,722, filed on Feb. 20, 2007.

(51) Int. Cl.
*B01D 53/22* (2006.01)
*B05D 3/02* (2006.01)
*B05D 3/12* (2006.01)
*C23C 16/52* (2006.01)

(52) U.S. Cl. .......... 95/55; 95/1; 95/8; 95/45; 95/56; 96/4; 96/11; 96/417; 96/422; 55/524; 55/DIG. 5; 427/8; 427/299; 427/331; 427/367; 427/372.2; 427/379; 427/380; 427/383.1; 427/402; 427/419.1

(58) Field of Classification Search .......... 95/1, 8, 95/23, 45, 53, 56, 55; 96/4, 11, 417, 422; 55/524, DIG. 5; 427/8, 299, 331, 355, 367, 427/372.2, 379, 380, 383.1, 402, 419.1
See application file for complete search history.

(56) References Cited

U.S. PATENT DOCUMENTS

| | | | | |
|---|---|---|---|---|
| 4,881,954 A | * | 11/1989 | Bikson et al. | 95/55 |
| 5,386,715 A | * | 2/1995 | Evans et al. | 73/31.05 |
| 6,315,820 B1 | * | 11/2001 | Saloka et al. | 96/11 |
| 7,524,361 B2 | * | 4/2009 | Park et al. | 96/4 |
| 7,531,215 B2 | * | 5/2009 | Apte et al. | 95/56 |
| 2004/0237780 A1 | * | 12/2004 | Ma et al. | 95/55 |
| 2004/0244589 A1 | * | 12/2004 | Bossard et al. | 96/11 |
| 2006/0016332 A1 | | 1/2006 | Ma et al. | 95/55 |
| 2006/0115643 A1 | * | 6/2006 | Noda et al. | 428/312.8 |
| 2007/0256562 A1 | * | 11/2007 | Routkevitch et al. | 96/11 |
| 2009/0120287 A1 | * | 5/2009 | Del Paggio et al. | 95/56 |

FOREIGN PATENT DOCUMENTS

| | | |
|---|---|---|
| EP | 1547673 | 3/2004 |
| EP | 1666410 | 11/2005 |
| JP | 2004-216275 | 1/2003 |
| JP | 2004-216275 A * | 8/2004 |
| WO | WO 2006/034103 A1 * | 3/2006 |
| WO | WO2006031080 | 3/2006 |
| WO | WO2006034086 | 3/2006 |
| WO | WO2006034103 | 3/2006 |
| WO | WO2007024253 | 3/2007 |
| WO | WO2008118560 | 10/2008 |

OTHER PUBLICATIONS

Saini, Alpna; "An Investigation of the Cause of Leak Fromation in Palladium Composite Membranes"; Worcester Polytechnic Institute; May 2006.*
U.S. Appl. No. 11/932,223, filed Oct. 31, 2007.
U.S. Appl. No. 11/932,159, filed Oct. 31, 2007.
U.S. Appl. No. 12/032,894, filed Feb. 18, 2008.
"An Investigation of the Cause of Leak Formation in Palladium Composite Membranes," by Alpna Saini, Worcester Polytechnic Institute, May 2006.
"Changes in Hydrogen Permeability and Surface State of Pd—Ag/Ceramic Composite Membranes After Thermal Treatment," Journal of Membrane Science, 252 (2005), pp. 145-154.

* cited by examiner

*Primary Examiner* — Jason M Greene
(74) *Attorney, Agent, or Firm* — Charles W. Stewart

(57) ABSTRACT

A method of preparing a gas separation membrane system and the gas separation membrane system itself, wherein the method includes applying a layer of a gas-selective material to a porous substrate followed by heat-treating thereof in an inert gaseous atmosphere and then polishing and repeating these steps to thereby provide the gas separation membrane system or a structure that may suitably be used in a gas separation membrane system.

18 Claims, No Drawings

METHOD OF MAKING A LEAK STABLE GAS SEPARATION MEMBRANE SYSTEM

This application claims the benefit of U.S. Provisional Application Ser. No. 60/890,722, filed Feb. 20, 2007.

This invention relates to a gas separation membrane system, a method of making leak-stable, gas separation membrane systems and the use thereof.

There has been for many years an ongoing effort to develop new and improved gas separation membranes and membrane systems useful in selectively separating one gas from a mixture of gases. For instance, hydrogen-permeable composite metal membranes that include a thin noble metal coating over a porous support material are known to be useful in the separation of hydrogen from hydrogen-containing gaseous streams. However, these types of hydrogen separation membranes tend to be unstable in their performance when used in high temperature hydrogen separation applications. This lack of stability is attributed to leak development in the noble metal coating layer and the permeable base metal of the membrane when it is used in high temperature applications.

The development of leaks in the membrane has been attributed to grain growth along the palladium grain boundaries. Described in the thesis of Alpna Saini entitled "An Investigation of the Cause of Leak Formation in Palladium Composite Membranes," Worcester Polytechnic Institute, May 2006, is the preparation of various palladium-plated substrates that were annealed at high temperatures in either a hydrogen atmosphere or a helium atmosphere. Also presented in the Saini thesis is a morphology of the grain size and grain boundaries of the palladium deposits of the palladium-plated substrates after annealing. Saini found that the palladium grain growth was observed both in samples that were preannealed at 500° C. in an $H_2$ atmosphere and preannealed at 500° C. in a He atmosphere, but, that, the grain growth occurred faster in a hydrogen atmosphere than in a helium atmosphere. Thus, Saini concludes that leaks tend to develop faster in hydrogen annealed, as opposed to helium annealed, palladium membranes.

Saini proposed that one approach to avoiding leak formation in palladium membranes is by the successive plating of a thin layer of palladium followed by annealing. Sinai indicates that this preparation method would provide for grain growth and more stable grain boundaries between the successive annealing steps. By conducting the annealing between the plating steps the grain boundaries of each of the semi-dense palladium layers can be made more stable and straightened out and the multiple stacking of the palladium layers results in an overall more highly stable dense palladium layer. One of the teachings of Saini, thus, is that as a result of the grain boundary migration happening faster in hydrogen than in helium, the successive high-temperature annealing of semi-dense palladium membrane layers in the presence of hydrogen can provide for a final, dense membrane that is more stable against leak formation than the successive high-temperature annealing of a semi-dense palladium membrane layer in the presence of helium. The Saini thesis teaches nothing of successive annealing steps of semi-dense membranes in the presence of gases other than hydrogen and helium, such as, for example, the gases of nitrogen, argon, neon, and carbon dioxide. The teachings of the Saini thesis suggest that the use of inert gases in successive annealing and plating of semi-dense palladium layers to ultimately form a highly stable, dense palladium membrane would not be favorable or desirable.

Yang et al. presents in their Journal of Membrane Science, 252 (2005), pp 145-154, paper entitled "Changes in hydrogen permeability and surface state of Pd—Ag/ceramic composite membranes after thermal treatment," results from testing of the effect of thermal treatment in air of a palladium-silver membrane system on its hydrogen permeability. They found that such a thermal treatment of a membrane system improves its hydrogen permeability. It is noteworthy that the Yang et al. testing was of an already prepared composite membrane and that the thermal treatment was not done between the application of successively applied semi-dense layers of membrane materials in the manufacture of the composite membrane. Moreover, the Yang et al. thermal treatment was done in an air atmosphere instead of an inert gas atmosphere such as those gases selected from the group consisting of nitrogen, argon, neon, and carbon dioxide.

In co-pending patent application, U.S. application Ser. No. 11/932,223, filed 31 Oct. 2007, which the entirety of the disclosure thereof is incorporated herein by reference, is disclosed a novel method of making a composite gas separation membrane system using nanoscale metal material in the plating of a membrane layer on a porous substrate. One of the steps of the novel method disclosed therein may include the heat-treatment of a porous substrate that has been plated with nanoparticles of a gas-selective metal. This heat-treatment step is performed to sinter the nanoparticles and may be conducted in the presence of an inert gaseous atmosphere that includes such gases as nitrogen, helium, argon, neon and carbon dioxide. The novel method presented in U.S. application Ser. No. 11/932,223, however, is not necessarily focused upon the use of multiple, successive applications of gas-selective membrane layers that may each be semi-dense to a porous substrate with each application followed by a separate annealing treatment thereof in an inert gaseous atmosphere to provide stacked layers that, together, provide an overall highly-stable, dense gas-selective membrane.

One objective of the invention herein is to provide a method of making a highly-stable, dense gas-selective membrane.

Accordingly, provided is a method comprising coating the surface of a porous substrate with a layer of a gas-selective material followed by annealing of the thus-coated surface in the presence of an inert gaseous atmosphere to provide a thus-annealed and coated porous substrate; and repeating at least once the previously recited coating and annealing steps to thereby provide a gas separation membrane system having a highly-stable, dense membrane of said gas-selective material.

The gas separation membrane system of the invention comprises a porous substrate having its surface coated with an overlayer of a gas-selective material, wherein the thus-coated surface has been annealed in the presence of an inert gaseous atmosphere to provide a thus-annealed and coated porous substrate, and wherein said thus-annealed and coated substrate porous substrate having been at least once further coated and annealed as previously recited to thereby provide said gas separation membrane system having a highly-stable, dense membrane of said gas-selective material.

One inventive method providing for the preparation of elements of a gas separation membrane system is that which comprises applying to the surface of a porous substrate a layer of particles of a material selected from the group consisting of inorganic oxides, refractory metals and noble metal eggshell catalysts to thereby provide a surface treated substrate; coating said surface treated substrate with an overlayer of a first gas-selective material to thereby provide a first coated substrate; and heat treating under a first inert gaseous atmosphere said first coated substrate.

The inventive gas separation membrane system and that including the gas separation membrane system and components thereof made by the inventive method may be used in the separation of hydrogen from a hydrogen-containing gas stream, wherein the process comprising: passing said hydrogen-containing gas stream over the gas separation membrane system under temperature and pressure conditions such that hydrogen from said hydrogen-containing gas stream selectively passes through said gas separation membrane system; and recovering the thus separated hydrogen.

One of the important features of the inventive method for making a gas separation membrane system is the repeating, at least once, of the successive performance of the two steps of plating (coating) of a thin layer of a gas-selective material (metal) onto a porous substrate followed by heat-treating (annealing) in an inert gaseous atmosphere of the plated, thin layer of gas-selective material. It has been found that the repeating of the two steps of plating and annealing that are conducted in successive order can provide a gas separation membrane system having a membrane layer that is gas-tight, or dense, and highly stable when used in high-temperature hydrogen gas separation applications.

When referring herein to a membrane that is gas-tight, or dense, what is meant is that the membrane allows for permeation of hydrogen gas through it but with little, if any, other gas being allowed to permeate the membrane. Thus, the membrane will have a high selectivity.

As the term is used herein, selectivity is a measured attribute of a membrane or membrane system that is represented by the ratio of the flux of hydrogen through the membrane divided by the flux of a leak detecting gas such as nitrogen or helium through the membrane.

In the manufacture of high purity hydrogen, an ideal composite membrane would have a selectivity that approaches infinity, but, practically, the selectivity relative to nitrogen for a membrane is normally in the range of from 100 to 1,000. The development and formation of leaks in a membrane can result from imperfections in the membrane layer and is an indication that it is not gas-tight or dense.

When referring to the stability of a membrane, what is meant is that it may be used in the separation of hydrogen gas from gas mixture for a lengthy period of time even under reasonably harsh high-temperature and pressure conditions and not develop leaks. Thus, a highly stable membrane has a reasonably low rate of decline in its selectivity during its use.

It is a critical aspect of the inventive method of preparing a gas separation membrane system that for each time the porous substrate is coated or plated with a layer of a gas-selective material the coated porous substrate is thereafter heat-treated, or annealed, in the presence of or under an inert gaseous atmosphere. Possible inert gases that may be used in this heat treatment step include nitrogen, helium, argon, neon and carbon dioxide. The preferred inert gas for use in the heat treatment is one selected from the group consisting of nitrogen, argon, neon and carbon dioxide, and, the most preferred inert gas for use in the heat treatment is nitrogen. It is desirable for the heat treatment not to be conducted in the presence of either a hydrogen or an oxygen atmosphere.

The inert gaseous atmosphere under which the heat treatment is conducted should have no material concentration of such gases as hydrogen, oxygen, and air. The gaseous atmosphere used during the heat treatment of the plated porous substrate should comprise substantially entirely the particular inert gas that is used for the heat treatment. For instance, the gaseous atmosphere can comprise at least 90 volume percent of an inert gas such as nitrogen, and, preferably, the gaseous atmosphere comprises at least 95 volume percent of the inert gas. Most preferably, the gaseous atmosphere comprises at least 98 volume percent of the inert gas. A typical upper limit on the gas purity of the inert gas is 99.9 volume percent.

The heat treatment is conducted at a temperature that sufficiently treats the thin layer of gas-selective material (metal) that is plated upon the surface of the porous substrate. While the required heat treatment temperature depends somewhat upon the particular metal or metal alloy that is plated upon the porous substrate and the thickness of the layer thereof, generally, the heat treatment temperature should be in the range of from 200° C. to 800° C. The preferred heat treatment temperature is in the range of from 250° C. to 700° C., and, most preferred, the heat treatment temperature is in the range of from 350° C. to 600° C.

The heat treatment is conducted for a period of time sufficient to provide the necessary treatment of the layer of gas-selective material and prepare it for the next series of plating and heat treatment. The heat treatment time period may, thus, be in the range upwardly to 48 or more hours, but, a typical heat treatment time period is in the range of from 0.1 hours to 12 hours. It is preferred, however, for the heat treatment time to be minimized to only such a time necessary to provide the treatment of the layer of gas-selective metal required to achieve the benefits of the invention. It is expected that such a time period is in the range of from 0.2 to 10 hours, or even in the range of from 0.3 hours to 8 hours.

The pressure under which the heat treatment is conducted can be in the range of from 0.5 atmospheres (absolute) to 20 atmospheres. More typically, the heat treatment pressure is in the range of from 0.8 atm to 10 atm.

It can be desirable to polish the surface of the layer of gas-selective metal or material that has been coated upon the porous substrate after its heat treatment but prior to a repeat of the coating and heat treatment steps. The polishing improves the surface of the plated layer of gas-selective metal or material for further plating and heat treatment by minimizing surface abnormalities and deformities and by filling openings such as cracks, pinholes and other imperfections that may be in the thin layer. Possible abrading or polishing methods are disclosed in co-pending application number U.S. Ser. No. 12/032,894, filed 18 Feb. 2008, the entire text of which is incorporated herein by reference.

While it is desirable to prepare the gas separation membrane system by repeating the two steps of coating the surface of a porous substrate with a layer of a gas-selective material followed by annealing of the thus-coated surface, it may not be necessary to repeat these steps more than once. The number of times that the two steps of coating and annealing are to be repeated is dependent upon whether or not the stacked membrane layers are dense and provide for the necessary hydrogen permeance and selectivity.

In the preparation of the gas separation membrane system it may be desirable for each of the individual layers of gas-selective material that is coated upon the porous substrate to only be semi-dense and for the membrane that includes a total of the stacked layers of gas-selective material to be dense. To achieve this benefit, the inventive method of making the gas separation membrane system can further include the additional step of determining or measuring the selectivity of the membrane system after each of the sequences of plating and annealing to determine the need to proceed further with the plating and annealing steps. Thus, in the preparation of the gas separation membrane system, after the porous substrate is plated with a layer of the gas-selective material and thereafter annealed, the selectivity of the membrane system is determined by the use of any suitable measuring means to thereby provide a measured selectivity. As already noted earlier herein, the selectivity of the membrane system is the ratio of its hydrogen flux to the flux of a leak detecting gas such as nitrogen or helium provided by the membrane system. This measured selectivity is then compared to a desired selectivity for the membrane system, and, if the measure selectivity is greater than or equal to the desired selectivity, then the porous substrate no longer needs to further undergo the steps of plating and annealing. But, on the otherhand, if the measured selectivity is less than the desired selectivity, then the steps of plating and annealing are repeated.

It is desirable for the membrane system to have a high hydrogen permeability as well as a high selectivity. The hydrogen permeability of the membrane system is impacted by the thickness and other properties of the layer of gas-selective material that is deposited upon the surface of the porous substrate. One of the benefits of the inventive method is that it allows for the plating of very thin, and, even, ultra thin, layers of gas-selective metal upon the porous substrate surface. And, while each of the individual layers may not be completely dense to gases other than hydrogen, the cumulative of the stacked layers is dense to gases other than hydrogen. The use of the step of annealing in an inert gaseous atmosphere after each application or plating of the gas-selective material to the porous substrate surface permits each of the individual layers to be less than dense, i.e., semi-dense, and the cumulative thickness of the stacked layers may be minimized so that hydrogen permeability of the membrane is enhanced.

While it is best for a membrane system to have as high of a selectivity as is possible, typically, an acceptable or desired selectivity, relative to helium, for the membrane system is at least 100. More typically, the desired selectivity of a membrane system is at least 500, and, most typically, the desired selectivity of the membrane system should exceed 1,000. The selectivity of the membrane system may even exceed 5,000 or even exceed 10,000, and, thus, it is desirable for it to have such a selectivity. The use of the annealing step after each application of a layer of gas-selective metal not only provides for a membrane system that is dense and suitably hydrogen permeable, but it also provides for one that is highly stable.

The porous substrate used in the preparation of the gas separation membrane system of the invention or any elements thereof may include any porous material that is permeable by hydrogen and is suitable for use as a support for the layer of gas-selective material. The porous substrate may be of any shape or geometry provided it has a surface that permits the application thereto of a layer of intermetallic diffusion barrier particles, as described below, or a layer of gas-selective material. Such shapes can include planar or curvilinear sheets of the porous metal material having an undersurface and a top surface that together define a sheet thickness, or the shapes can be tubular, such as, for example, rectangular, square and circular tubular shapes that have an inside surface and an outside surface that together define a wall thickness and with the inside surface of the tubular shape defining a tubular conduit.

The porous substrate can include any suitable porous metal material selected from any of the materials known to those skilled in the art including, but not limited to, the stainless steels, such as, for example, the 301, 304, 305, 316, 317, and 321 series of stainless steels, the twenty or more HASTELLOY® alloys, for example, HASTELLOY® B-2, C-4, C-22, C-276, G-30, X and others, and the INCONEL® alloys, for example, INCONEL® alloy 600, 625, 690, and 718. The porous metal material, thus, can comprise an alloy that is hydrogen permeable and which comprises chromium, and, preferably, further comprises nickel. The porous metal material may further comprise an additional alloy metal selected from the group consisting of iron, manganese, molybdenum, tungsten, cobalt, copper, titanium, zirconium, aluminum, carbon, and any combination thereof.

One particularly desirable alloy suitable for use as the porous metal material can comprise nickel in an amount in the range of upwardly to about 70 weight percent of the total weight of the alloy and chromium in an amount in the range of from 10 to 30 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy. The Inconel alloys are preferred over other alloys.

The thickness (e.g. wall thickness or sheet thickness, both as described above), porosity, and pore size distribution of the pores of the porous substrate are properties of the porous substrate selected in order to provide a gas separation membrane system of the invention that has the desired performance characteristics and other desired properties. It can be desirable to use a porous substrate having a reasonably small thickness so as to provide for a high gas flux therethrough.

The thickness of the porous substrate for the typical application contemplated hereunder can be in the range of from about 0.05 mm to about 25 mm, but, preferably, the thickness is in the range of from 0.1 mm to 12.5 mm, and, more preferably, from 0.2 mm to 5 mm.

The porosity of the porous substrate can be in the range of from 0.01 to 0.5. The term porosity, as used herein, is defined as the proportion of non-solid volume to the total volume (i.e. non-solid and solid) of the porous metal substrate material. A more typical porosity is in the range of from 0.05 to 0.3.

The pore size distribution of the pores of the porous substrate can vary with the median pore diameter typically being in the range of from about 0.1 µm to about 15 µm. More typically, the median pore diameter is in the range of from 0.2 µm to 10 µm, and, most typically, from 0.3 µm to 5 µm.

The gas-selective material used in the preparation of the gas separation membrane system of the invention or any elements thereof may include any metal or metal alloy or mixture of alloyable metals that has the property of being selectively permeable to a gas, and, thus, when placed as a layer upon the surface of the porous substrate, is capable of functioning so as to selectively allow the passage of a selected gas through the layer while preventing the passage of other gases. It is preferred for the gas-selective metal to be hydrogen-selective by selectively providing for the passage of hydrogen while preventing the passage of other gases.

Possible gas-selective metals or materials include those selected from the group of metals consisting of platinum (Pt), palladium (Pd), gold (Au), silver (Ag), niobium (Nb), iridium (Ir), rhodium (Rh), ruthenium (Ru) and alloys of such metals. For hydrogen gas separation membrane systems, it is preferred for the gas-selective material to be a hydrogen-selective metal such as platinum, palladium, gold, silver, and combinations thereof, including alloys. The preferred hydrogen-selective metal is palladium. The preferred hydrogen-selective alloys include alloys of palladium and silver, or platinum and silver, or gold and silver, or combinations of any two or more of palladium, platinum, gold and silver.

The coating of the membrane layer of gas-selective material is applied to the porous substrate of the gas separation membrane system by any suitable means or method known to those skilled in the art. Possible deposition methods include electroless plating, thermal deposition, chemical vapor deposition, electroplating, spray deposition, sputter coating, e-beam evaporation, ion beam evaporation and spray pyrolysis. A preferred deposition method is electroless plating.

The typical thickness of the membrane layer supported upon the porous substrate of the invention can be in the range of from 0.001 µm to 50 µm, but for many gas separation applications, a membrane thickness in the upper end of this range may be too thick to provide for a reasonable gas flux that allows for a desired gas separation. Generally, a membrane thickness should be less than 20 µm, and, even less than 10 µm. Thus, it is desirable for the membrane thickness to be in the range of from 0.001 µm to 50 µm, preferably, from 0.01 µm to 20 µm, and, most preferably, from 0.1 µm to 10 µm One embodiment of the inventive method to prepare an element of the membrane system includes the application to the surface of the porous substrate of the membrane system, prior to plating thereof with a gas-selective metal, a layer of intermetallic diffusion barrier particles of a material selected from the group consisting of inorganic oxides, refractory metals and noble metal eggshell catalyst. These particles are to be of the size so that they, or at least a portion of the particles, can fit, at least partially, within certain of the pores of the porous substrate used to support the membrane of gas-selective metal. Thus, they generally should have a maximum dimension of less than about 50 micrometers (µm). The particle size (i.e., the maximum dimension of the particle) of the particles will, also, generally, depend on the pore size distribution of the pores of the porous substrate used in the preparation of the gas separation membrane of the invention.

Typically, the median particle size of the particles of inorganic oxides, refractory metals or noble metal eggshell catalyst will be in the range of from 0.1 µm to 50 µm. More specifically, the median particle size is in the range of from 0.1 µm to 15 µm. It is preferred for the median particle size of the particles to be in the range of from 0.2 µm to 3 µm.

Examples of inorganic oxides that may suitably be used as the layer of intermetallic diffusion barrier particles include alumina, silica, zirconia, titania, ceria, silicon, carbide, chromium oxide, ceramic materials, and zeolites. The refractory metals may include tungsten, tantalum, rhenium, osmium, iridium, niobium, ruthenium, hafnium, zirconium, vanadium, chromium and molybdenum. As for the noble metal eggshell catalyst that may suitably be used as a layer of intermetallic diffusion barrier particles that is applied to the surface of the porous substrate, the noble metal eggshell catalyst is defined and described in great detail in co-pending U.S. patent application Ser. No. 11/932,159, filed 31 Oct. 2007, the entire text of which is incorporated herein by reference.

The layer of intermetallic diffusion barrier particles particles applied to the surface of the porous substrate to provide a surface treated substrate should be such as to cover the pores of the porous substrate and to provide a layer having a layer thickness that is greater than 0.01 µm, and, generally, in the range of from 0.01 µm to 25 µm. It is preferred for the layer thickness to be in the range of from 0.1 µm to 20 µm, and, most preferably, from 2 µm to 3 µm.

Once the layer of intermetallic diffusion barrier particles is applied to the surface of the porous substrate, the resulting surface treated substrate is then coated with an overlayer of a first gas selective material to provide a first coated substrate. The thickness of the overlayer should be as small as is feasible, and, due to certain of the novel aspects of the inventive method that includes the heat treatment in an inert gaseous atmosphere of the first coated substrate, the overlayer thickness may be exceptionally thin. It does not necessarily need to be gas-tight; because, the heat treatment followed by subsequent further application of the steps of coating and heat treating will provide a final gas separation membrane system that is gas tight.

Therefore, the thickness of the overlayer can be less than 50 µm, but, preferably, the overlayer thickness is less than 20 µm, and, more preferably, it is less than 10 µm. Typically, the overlayer thickness can be in the range of from 0.1 µm to 50 µm, preferably, from 0.1 µm to 20 µm, and, more preferably, from 0.1 µm to 10 µm.

The first coated substrate is then heat treated in a first inert gaseous atmosphere under the heat treatment conditions as described in detail elsewhere herein.

In a further embodiment of the inventive method, the first coated substrate that has been heat treated is further coated with a second overlayer of a second gas selective material to provide a second coated substrate. As with the first overlayer of the first gas selective material, the thickness of the second overlayer should also be as small as is feasible, and, due to certain of the novel aspects of the inventive method that includes the heat treatment in an inert gaseous atmosphere of the second coated substrate, the second overlayer thickness may be exceptionally thin.

A further aspect of the inventive method includes a determination of the need to repeat the steps of coating the porous substrate followed by heat treatment thereof subsequent to the heat treatment of a coated substrate. In this embodiment, subsequent to the heat treating of the first coated substrate, the selectivity of the first coated substrate that has been heat treated is determined or measured to thereby provide a measured selectivity of the first coated substrate. This measured selectivity is compared to a desired selectivity for the first coated substrate, and, if the measured selectivity is less than the desired selectivity, the first coated substrate is further coated with a second overlayer of a second gas-selective material to thereby provide a second coated substrate. This second coated substrate is then heat treated under a second inert gaseous atmosphere under the heat treatment conditions as described elsewhere herein. On the otherhand, if the measured selectivity is at least as high as the desired selectivity, then there is not a need to further repeat the two steps of coating and heat treating of the substrate that has already been both coated and heat treated in one or more cycles.

It can also be desirable, as noted above, to polish the surface of the overlayer of gas-selective material after each coating or application but prior to heat treatment thereof. Thus, subsequent to the heat treatment of the first coated substrate and prior to the coating of the first coated substrate that has been heat treated with a second overlayer of the second gas-selective material, the surface of the first coated substrate is polished. As described above, the polishing improves the surface of the first coated substrate and allows for a much thinner layer of the first gas-selective material and overall thickness of gas membrane material that is still gas tight and highly stable.

The gas separation membrane system or elements thereof made by the inventive methods described herein may be used in the selective separation of a select gas from a gas mixture. The gas separation membrane is particularly useful in the separation of hydrogen from a hydrogen-containing gas stream, especially, in high temperature applications.

One example of a high temperature application in which the gas separation membrane system may be used is in the steam reforming of a hydrocarbon, such as methane, to yield carbon monoxide and hydrogen, followed by the reaction of the yielded carbon monoxide with water in a so-called water-gas shift reaction to yield carbon dioxide and hydrogen.

These catalytic reactions are equilibrium type reactions, and the inventive gas separation membrane is useful in the simultaneous separation of the yielded hydrogen while conducting the reactions in order to enhance the equilibrium conditions to favor hydrogen yield. The reaction conditions under which the reactions are simultaneously conducted can include a reaction temperature in the range of from 400° C. to 600° C. and a reaction pressure in the range of from 1 to 30 bars.

The gas separation membrane system and elements thereof made by the inventive methods can be used in a wide variety of applications that involve the separation of hydrogen from gas streams that comprise other gases, for example, those selected from the group of gases consisting of carbon dioxide, water, methane or mixtures thereof. In such applications, the temperature conditions can be in the range upwardly to 600° C., for instance, in the range of from 100° C. to 600° C., and the pressure conditions can be in the range upwardly to 50 bar, for instance, in the range of from 1 to 40 bar.

The following examples are provided to further illustrate the invention, but they are, however, not to be construed as limiting its scope.

EXAMPLE 1

This Example 1 describes the manufacture of a composite gas separation module or membrane system that utilizes a layer of particles of alumina and a noble metal eggshell catalyst and is further overlaid with multiple palladium coatings by use of electroless plating but with no intermediate polishing of the overlaid palladium coating or heat treatment thereof in an inert gaseous atmosphere being done between each of the plating steps.

A composite gas separation module was prepared using a 1-inch OD×6-inch length duplex porous Inconel support that was supplied by Mott Corporation. The support was degreased thoroughly and extensively tested to ensure suitability for use in the experiment.

Application of Particles of Eggshell Catalyst and Alumina

A slurry of 1 μm particles one-half of which included 1.23 wt % alloyed palladium-silver on alpha alumina eggshell catalyst and the other one-half included alpha alumina particles contained in deionized water was applied to the surface of the Inconel support (porous substrate) by means of vacuum filtration to form a layer of particles thereon and to thereby provide a porous substrate that has been surface treated.

Coating with Overlayer of Palladium and Drying

The surface treated substrate was then coated with an overlayer of palladium by electrolessly plating the surface treated support with palladium, without the use of any activation methods, in a plating bath containing 450 mL of palladium plating solution and 1.8 mL of 1M hydrazine hydrate solution. The palladium plating solution included 198 ml of 30% ammonium hydroxide solution, 4 grams tetraaminepalladium (II) chloride, 40.1 grams ethylenediaminetetraacetic acid disodium salt, and 1 liter deionized water.

During the plating, a slight vacuum of 5-6 inches of Hg was maintained on the interior of the support for 5 minutes, after which the vacuum source was turned off and the plating continued for 80 minutes at 22° C. The module was then thoroughly washed with 60° C. deionized water, and then dried at 140° C. for 8 hours.

Plating with Layer of Palladium and Drying

The module was then plated for 90 minutes, without vacuum or activation, in 450 mL of the palladium plating solution and 1.8 mL of 1M hydrazine hydrate solution. The module was then thoroughly washed with hot deionized water to remove any residue salts and then dried at 140° C. for 8 hours.

Plating with Layers of Palladium and Drying

The module was completed by plating in two palladium plating baths containing 450 mL of palladium plating solution and 1.8 mL of 1M hydrazine hydrate solution, while under a vacuum of 28-30 inches Hg applied to the tube side of the support. The module was then thoroughly washed with hot deionized water to remove residual salts and then dried at 140° C. for 8 hours.

Testing and Results

The resulting dense, gas-selective, composite hydrogen gas separation module of palladium on an Inconel support had a gas dense layer thickness of 5.08 microns.

The gas separation module (or system) was tested under steam reforming conditions at 500° C. The module initially displayed a hydrogen permeance in the range of from 60 to 70 $m^3/(m^2)(hr)(bar^{0.5})$. The module lacked suitable stability under the steam reforming conditions in that it quickly developed a leak shortly after its placement into use and the leak increased at a rapid rate during its use.

It is significant to note that the membrane layer of the gas separation system was applied in multiple coatings with no intermediate high-temperature, heat-treatments (annealing) in an inert gaseous atmosphere between coating steps. The resulting gas separation module failed to have good hydrogen selectivity.

EXAMPLE 2

This Example 2 describes the manufacture of a composite gas separation module or membrane system that utilizes a layer of particles of alumina and a noble metal eggshell catalyst and is further overlaid with multiple palladium coatings by use of electroless plating with intermediate heat treatment in an inert gaseous atmosphere being conducted between plating steps.

A composite gas separation module was prepared using a 1-inch OD×6-inch length duplex porous Inconel support that was supplied by Mott Corporation. The support was degreased thoroughly and extensively tested to ensure suitability for use in the experiment.

Application of Particles of Eggshell Catalyst and Alumina

A slurry of 1 μm particles one-half of which included 1.23 wt % alloyed palladium-silver on alpha alumina eggshell catalyst and the other one-half included alpha alumina particles contained in deionized water was applied to the surface of the Inconel support (porous substrate) by means of vacuum filtration to form a layer of particles thereon and to thereby provide a porous substrate that has been surface treated.

Coating Surface Treated Substrate with Palladium Overlayer and Drying

The surface treated substrate was then coated with an overlayer of palladium by electrolessly plating the surface treated support with palladium, without the use of any activation methods, in a plating bath containing 450 mL of palladium plating solution and 1.8 mL of 1M hydrazine hydrate solution at 22° C. The palladium plating solution included 198 ml of 28-30% ammonium hydroxide solution, 4 grams tetraaminepalladium (II) chloride, 40.1 grams ethylenediaminetetraacetic acid disodium salt, and 1 liter deionized water.

During the plating, a slight vacuum of 5-6 inches of Hg was maintained on the interior of the support for 5 minutes, after which the vacuum source was turned off and the plating continued for 80 minutes. The module was then thoroughly washed with 60° C. deionized water, and then dried at 140° C. for 8 hours.

Plating with Palladium and Drying

The module was then plated for 90 minutes at 60° C., without vacuum or activation, in 450 mL of the palladium plating solution and 1.8 mL of 1M hydrazine hydrate solution. The module was then thoroughly washed with hot deionized water to remove any residue salts and then dried at 140° C. for 8 hours.

Plating with Palladium and Drying

The module was then plated two times for 90 minutes in 450 mL of the palladium plating solution and 1.8 mL of 1M hydrazine hydrate solution at 60° C. while under a vacuum of 28-30 inches Hg that was applied to the tube side of the support. The module was then thoroughly washed with hot deionized water to remove any residue salts and then dried at 140° C. for 8 hours.

Plating with Palladium and Anneal in Nitrogen

The module was then plated for 45 minutes in 450 mL of the palladium plating solution and 1.8 mL of 1M hydrazine hydrate solution at 60° C. while under a vacuum of 28-30 inches Hg that was applied to the tube side of the support. The module was then thoroughly washed with hot deionized water to remove any residue salts and then dried at 140° C. for 8. This module was then heat treated (annealed) at a temperature of 500° C. for two hours under a nitrogen purge (a inert gaseous atmosphere).

Plating with Palladium and Anneal in Nitrogen

The module was completed by plating for 120 minutes in the palladium plating baths containing 450 mL of palladium plating solution and 1.8 mL of 1M hydrazine hydrate solution, at 60° C. and while under a vacuum of 28-30 inches Hg applied to the tube side of the support. The module was then thoroughly washed with hot deionized water to remove residual salts and then dried at 140° C. for 8 hours. This module was then heat treated (annealed) at a temperature of 500° C. for two hours under a nitrogen purge (a inert gaseous atmosphere).

Testing and Results

The resulting dense, gas-selective, composite hydrogen gas separation module of palladium on an Inconel support had a gas dense layer thickness of 7.3 microns.

The gas separation module (or system) was tested under steam reforming conditions at 500° C. The module displayed a hydrogen permeance in the range of from 60 to 70 $m^3/(m^2)(hr)(bar)$. While the module developed a small leak upon its placement into use, its selectivity remained highly stable throughout the test period with it yielding a high purity hydrogen of 98% at 60-70 $Nm^3/m^2 \cdot hr \cdot bar^{0.5}$ before the testing was stopped.

It is significant to note that the membrane layer of the gas separation system was applied in multiple coatings with intermediate high-temperature, heat-treatments (annealing) in an inert gaseous atmosphere being conducted between numerous of the coating steps. This gas separation system exhibited good selectivity and stability characteristics that were significantly better than those of the gas separation system of Example 1.

That which is claimed is:

1. A method, comprising:
    coating the surface of a porous substrate with a layer of a gas-selective material followed by annealing of the thus-coated surface in the presence of an inert gaseous atmosphere comprising an inert gas, wherein said inert gas is selected from the group consisting of nitrogen, argon, neon and carbon dioxide, to provide a thus-annealed and coated porous substrate; polishing said thus-annealed and coated porous substrate; repeating at least once the previously recited coating and annealing and polishing steps, to thereby provide a gas separation membrane system having a membrane layer of a thickness in the range of from 0.001 µm to 50 µm and a selectivity for hydrogen relative to helium of at least 500.

2. A method comprising:
    coating the surface of a porous substrate with a layer of a gas-selective material followed by annealing of the thus-coated surface in the presence of an inert gaseous atmosphere comprising an inert gas, wherein said inert gas is selected from the group consisting of nitrogen, argon, neon and carbon dioxide, to provide a thus-annealed and coated porous substrate; repeating at least once the previously recited coating and annealing steps to thereby provide a gas separation membrane system having a membrane layer of a thickness in the range of from 0.001 µm to 50 µm; and prior to each repeating step, polishing said thus-annealed and coated porous substrate; and additionally prior to each repeating step, determining the selectivity of said thus-annealed and coated porous substrate to thereby provide a measured selectivity; comparing said measured selectivity to a desired selectivity; and, if said measured selectivity is greater than or equal to said desired selectivity, ceasing the repeating of the coating and annealing steps.

3. A method, comprising:
    applying to the surface of a porous substrate a layer of particles of a material selected from the group consisting of inorganic oxides, refractory metals and noble metal eggshell catalysts to thereby provide a surface treated substrate, wherein said particles of said layer of particles have a median particle size in the range of from 0.1 µm to 50 µm;
    coating said surface treated substrate with an overlayer of a first gas-selective material to thereby provide a first coated substrate;
    heat-treating said first coated substrate under a first inert gaseous atmosphere, comprising nitrogen;
    coating said first coated substrate that has been heat treated with a second overlayer of a second gas-selective material to thereby provide a second coated substrate; and
    thereafter, heat treating under a second inert gaseous atmosphere, comprising nitrogen, said second coated substrate, thereby providing a gas separation membrane system exhibiting a selectivity relative to helium of at least 500.

4. A method as recited in claim 3, wherein the layer of particles applied to said porous substrate consists essentially of a noble metal eggshell catalyst.

5. A method as recited in claim 4, wherein the gas separation membrane system provided by said method exhibits a selectivity relative to helium of at least 1000.

6. A method comprising:
    applying to the surface of a porous substrate a layer of particles of a material selected from the group consisting of inorganic oxides, refractory metals and noble metal eggshell catalysts to thereby provide a surface treated substrate, wherein said particles of said layer of particles have a median particle size in the range of from 0.1 µm to 50 µm;

coating said surface treated substrate with an overlayer of a first gas-selective material to thereby provide a first coated substrate;

heat treating and polishing said first coated substrate;

subsequent to the heat treating and polishing of said first coated substrate, determining the selectivity of said first coated substrate to provide a measured selectivity;

comparing said measured selectivity to a desired selectivity for said first coated substrate; and if said measured selectivity is less than said desired selectivity, coating said first coated substrate that has been heat treated and polished with a second overlayer of a second gas-selective material to thereby provide a second coated substrate; and thereafter, heat treating under a second inert gaseous atmosphere said second coated substrate.

7. A method as recited in claim 3, further comprising:

subsequent to the heat treating of said first coated substrate and prior to coating said first coated substrate that has been heat treated with a second overlayer of said second gas-selective material, polishing said first coated substrate.

8. A gas separation membrane system element prepared by any one of the methods of claims 2-7.

9. A gas separation membrane system, comprising:

a porous substrate having its surface coated with a layer of a gas-selective material by means of electroless plating, wherein the thus-coated surface has been annealed in the presence of an inert gaseous atmosphere comprising an inert gas, wherein said inert gas is selected from the group consisting of nitrogen, argon, neon and carbon dioxide, to provide a thus-annealed and coated porous substrate, and wherein said thus-annealed and coated porous substrate having been at least once further coated by means of electroless plating and annealed as previously recited, and wherein said thus-annealed and coated substrate has been polished prior to each of said at least once further coating and annealing steps to thereby provide said gas separation membrane system exhibiting a selectivity relative to helium of 1000.

10. A process for separating hydrogen from a hydrogen-containing gas stream, wherein said process comprises:

passing said hydrogen-containing gas stream over a gas separation membrane system comprising a porous substrate having its surface coated with a layer of a gas-selective material, wherein the thus-coated surface has been annealed in the presence of an inert gaseous atmosphere comprising an inert gas, wherein said inert gas is selected from the group consisting of nitrogen, argon, neon and carbon dioxide, to provide a thus-annealed and coated porous substrate, wherein said thus-annealed and coated porous substrate having been at least once further coated and annealed as previously recited wherein said thus-annealed and coated substrate has been polished prior to each of said at least once further coating and annealing steps to thereby provide said gas separation membrane system having a selectivity for hydrogen relative to helium of at least 500, under temperature and pressure conditions such that hydrogen from said hydrogen-containing gas stream selectively passes through said gas separation membrane system; and recovering the thus separated hydrogen.

11. A method as recited in claim 1, wherein said inert gaseous atmosphere further comprises at least 90 volume percent said inert gas.

12. A method as recited in claim 11, wherein said inert gaseous atmosphere further comprises at least 90 volume percent nitrogen and no material concentration of hydrogen, oxygen or air.

13. A method as recited in claim 12, wherein said annealing step is conducted at a temperature in the range of from 200° C. to 800° C., a pressure in the range of from 0.5 atmospheres to 20 atmospheres, and for a period of time in the range of from 0.1 hours upwardly to 48 hours.

14. A method as recited in claim 13, wherein said thickness of said membrane layer is in the range of from 0.01 μm to 20 μm.

15. A method as recited in claim 14, wherein said gas separation membrane system exhibits a selectivity relative to helium of at least 1000.

16. A method as recited in claim 15, wherein said gas-selective material is selected from the group of metals consisting of platinum, palladium, gold, silver, niobium, iridium, rhodium, ruthenium and alloys of such metals.

17. A method as recited in claim 16, wherein said inert gaseous atmosphere comprises at least 95 volume percent nitrogen.

18. A method as recited in claim 17, wherein said annealing step is conducted at a temperature in the range of from 350° C. to 600° C., a pressure in the range of from 0.8 atmospheres to 10 atmospheres, and for a period of time in the range of from 0.2 hours upwardly to 10 hours in said inert gaseous atmosphere that comprises at least 95 volume percent nitrogen; wherein said gas-selective material is selected from the group of metals consisting of platinum, palladium, gold, silver and combinations thereof; wherein said thickness of said membrane layer is in the range of from 0.1 μm to 10 μm; and wherein said gas separation membrane system exhibits a selectivity relative to helium of at least 5000.

* * * * *